(12) United States Patent
Kim et al.

(10) Patent No.: US 7,717,012 B2
(45) Date of Patent: May 18, 2010

(54) ELECTRONIC ORGAN TYPE ACCELERATOR PEDAL

(75) Inventors: Kyung Min Kim, Busan (KR); Dong Hwan Kim, Ulsan (KR); Sung Yong Park, Busan (KR)

(73) Assignee: Donghee Industrial Co., Ltd. (KR)

( * ) Notice: Subject to any disclaimer, the term of this patent is extended or adjusted under 35 U.S.C. 154(b) by 696 days.

(21) Appl. No.: 11/637,586

(22) Filed: Dec. 12, 2006

(65) Prior Publication Data

US 2007/0157755 A1 Jul. 12, 2007

(30) Foreign Application Priority Data

Dec. 13, 2005 (KR) .................... 10-2005-0122740

(51) Int. Cl.
*G05G 1/30* (2008.04)
(52) U.S. Cl. ....................................... 74/512
(58) Field of Classification Search .................. 74/482, 74/512, 513, 560, 561
See application file for complete search history.

(56) References Cited

U.S. PATENT DOCUMENTS

| | | | |
|---|---|---|---|
| 3,500,702 A * | 3/1970 | Nautsch et al. ............... | 74/560 |
| 5,497,677 A | 3/1996 | Baumann et al. | |
| 6,089,120 A * | 7/2000 | Lochle et al. ................. | 74/514 |
| 7,044,019 B2 | 5/2006 | Hauschopp et al. | |
| 2005/0217410 A1* | 10/2005 | Sakuraba et al. ............. | 74/513 |
| 2007/0000345 A1* | 1/2007 | Leone .......................... | 74/513 |
| 2007/0151398 A1* | 7/2007 | Kim et al. ..................... | 74/513 |
| 2007/0193401 A1* | 8/2007 | Campbell ..................... | 74/560 |
| 2007/0289402 A1* | 12/2007 | La et al. ....................... | 74/513 |

FOREIGN PATENT DOCUMENTS

| | | |
|---|---|---|
| EP | 0 670 235 | 9/1995 |
| JP | 3-124204 | 5/1991 |
| JP | 4-69004 | 3/1992 |

* cited by examiner

*Primary Examiner*—Vicky A Johnson
(74) *Attorney, Agent, or Firm*—Hamre, Schumann, Mueller & Larson P.C (57) ABSTRACT

The present invention related to an electronic organ type accelerator pedal. The electronic organ type accelerator pedal according to the present invention is capable of enhancing stability by the compression spring having a double structure and the carrier restricting the reverse rotation of the foot plate, while maintaining the benefit of the electronic accelerator pedal which is capable of ensuring space, improving an operation feeling and reducing driver's fatigue since the electronic accelerator pedal is not influenced by tension changes of the cable, and improving fuel efficiency by improving fuel consumption rate.

9 Claims, 7 Drawing Sheets

ELECTRONIC ORGAN TYPE ACCELERATOR PEDAL

BACKGROUND OF THE INVENTION

1. Field of the Invention

The present invention relates to an electronic organ type accelerator pedal and, and particularly, to an electronic organ type accelerator pedal capable of improving an operation feeling and lightening driver's fatigue while achieving stability and economic feasibility.

2. Description of the Related Art

Generally, an accelerator pedal of a vehicle is a device which controls number of revolutions of an engine by regulating an inhalation quantity of a fuel-air mixture in a gasoline engine and an injection quantity of fuel in a diesel engine. The accelerator is classified into a pendant type which is hung on a dashboard and an organ type which is disposed on a floor panel depending on a mounting structure.

Nowadays, a mechanical accelerator pedal is widely used to control the quantity of combustion by opening/closing a throttle valve in a carburetor through an acceleration cable.

However, as for the mechanical accelerator pedal, when tension of an acceleration cable changes due to changes of environment or deterioration, errors are made in an operation range of a throttle valve and an injection pump.

In order to prevent the errors, recently, an electronic accelerator pedal has been developed to convert various kinds of control of an engine and peripheral devices to electronic control.

The electronic accelerator pedal is constructed without using an acceleration cable and thus ensures space, and is capable of improving an operation feeling and reducing driver's fatigue since it is not influenced by tension changes of the cable, and is capable of improving fuel efficiency by improving fuel consumption rate.

SUMMARY OF THE INVENTION

An object of the present invention is to provide an electronic organ type accelerator pedal maximizing stability while maintaining the benefit of the above electronic accelerator pedal.

In order to accomplish the above object, the present invention provides an electronic organ type accelerator pedal which includes: a housing that is fixedly disposed to a floor panel under a driver's seat; a foot plate whose one end is coupled with the housing by a hinge and other end is disposed to be rotated in a up and down direction of the housing by driver's force on the pedal; a rotation means that is rotatable inside the housing in conjunction with the operation of the foot plate; an elastic means that is supported by the rotation means and the inner side of the housing at both ends to apply restoring force to the rotation means; a cover that is coupled with the housing to cover an opening at one side of the housing and has a center protrusion formed at one side of the cover to be inserted in the rotation means and to serve as a rotating center; and a sensor that is coupled with the other side of the housing and outputs electrical signals to a throttle control unit to detect changes of output values based on the operation of the rotation means.

BRIEF DESCRIPTION OF THE DRAWINGS

The above and other features and advantages of the present invention will become more apparent by describing in detail preferred embodiments thereof with reference to the attached drawings in which.

DESCRIPTION OF THE PREFERRED EMBODIMENTS

Hereinafter, embodiments of the invention will be described with reference to the accompanying drawings.

Figure 1:
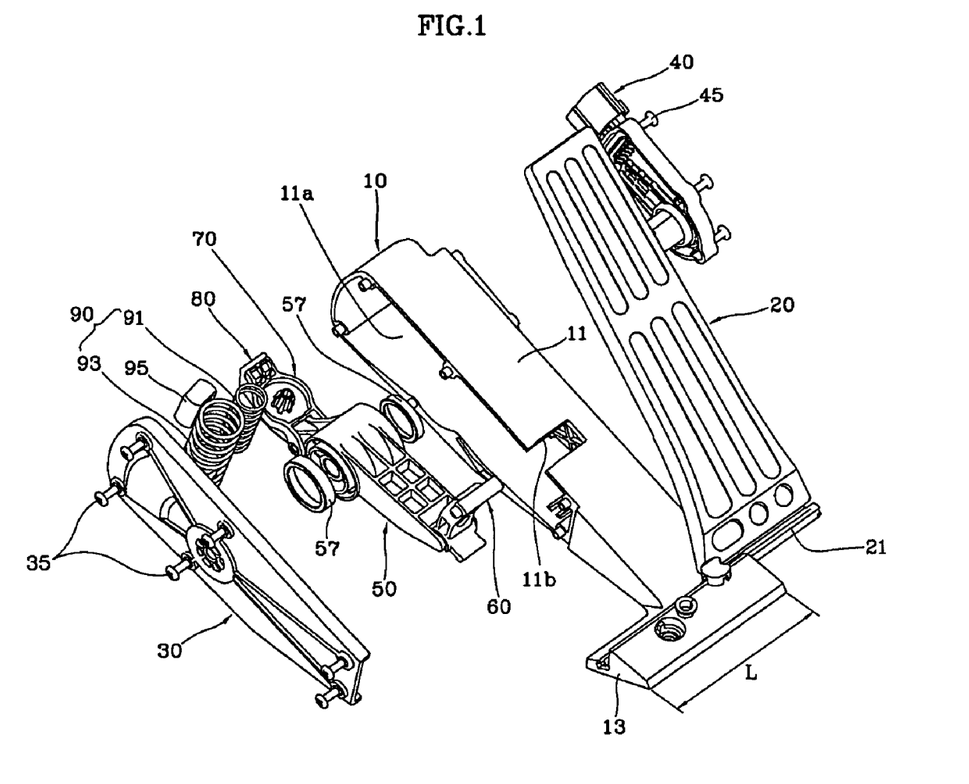
FIG. 1 is an exploded perspective view of an electronic organ type accelerator pedal according to the present invention.
Figure 2:
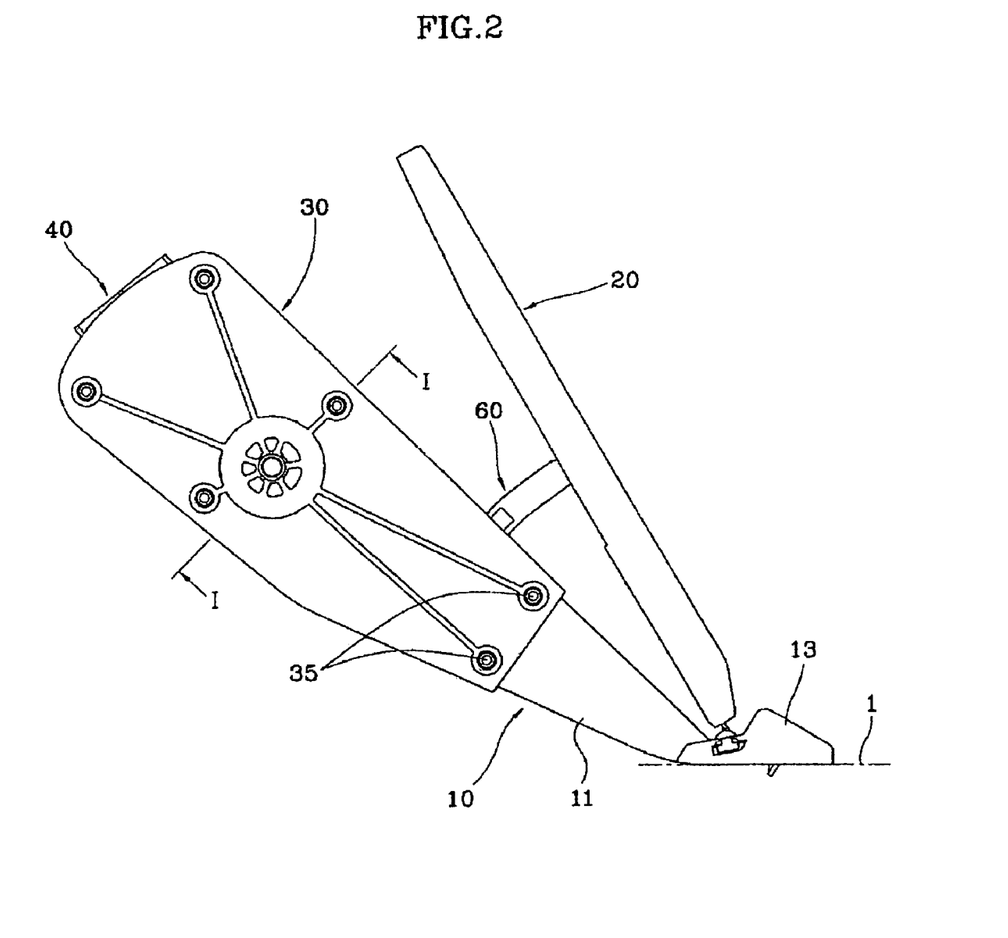
FIGS. 2 and 3 are left and right side views of an assembly of the pedal of FIG. 1.
Figure 3:
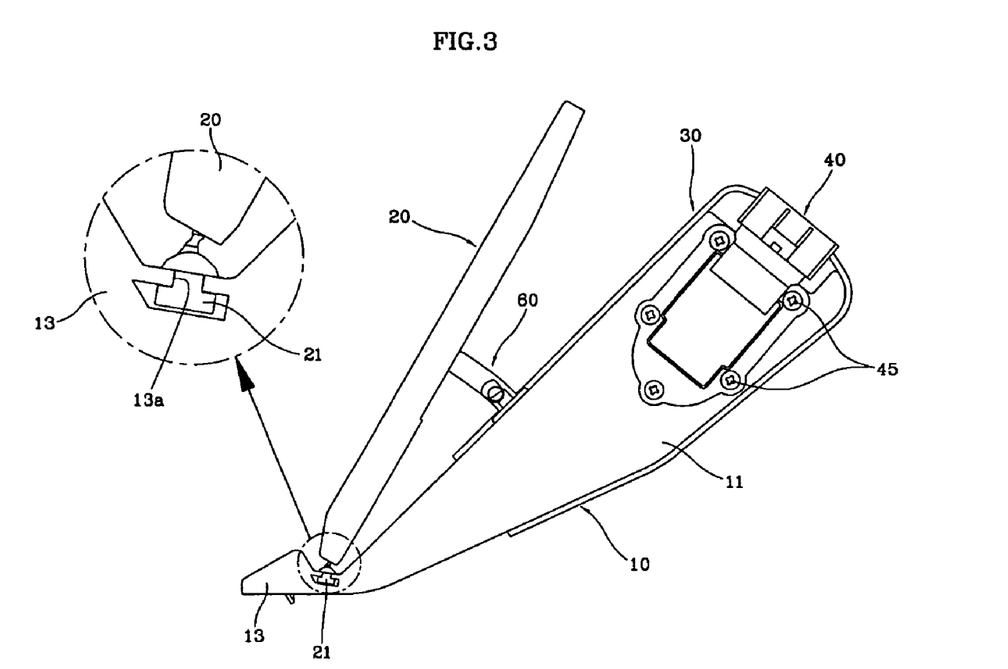
Figure 4:
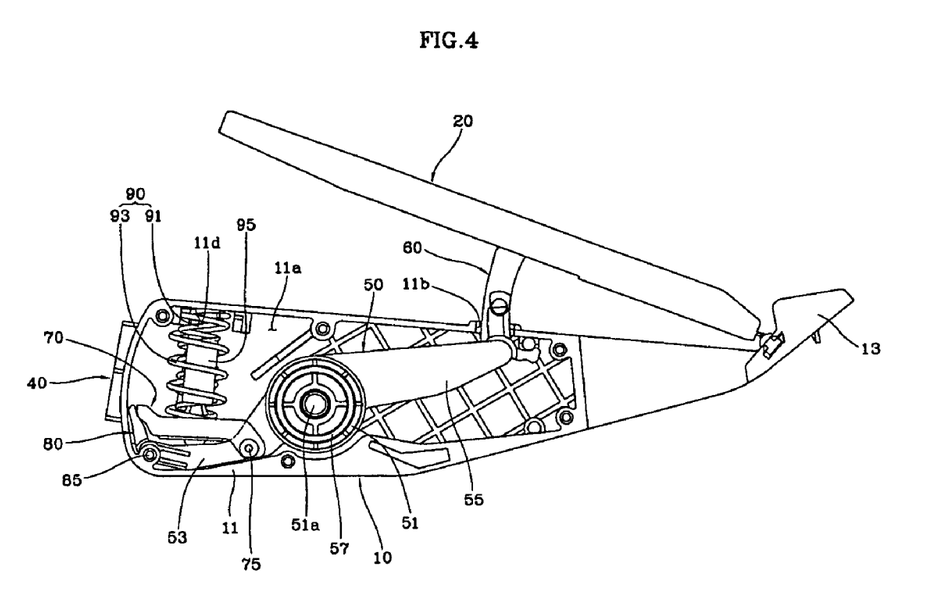
FIG. 4 is a side view illustrating the assembly of FIG. 2 from which a cover is removed.
Figure 5:
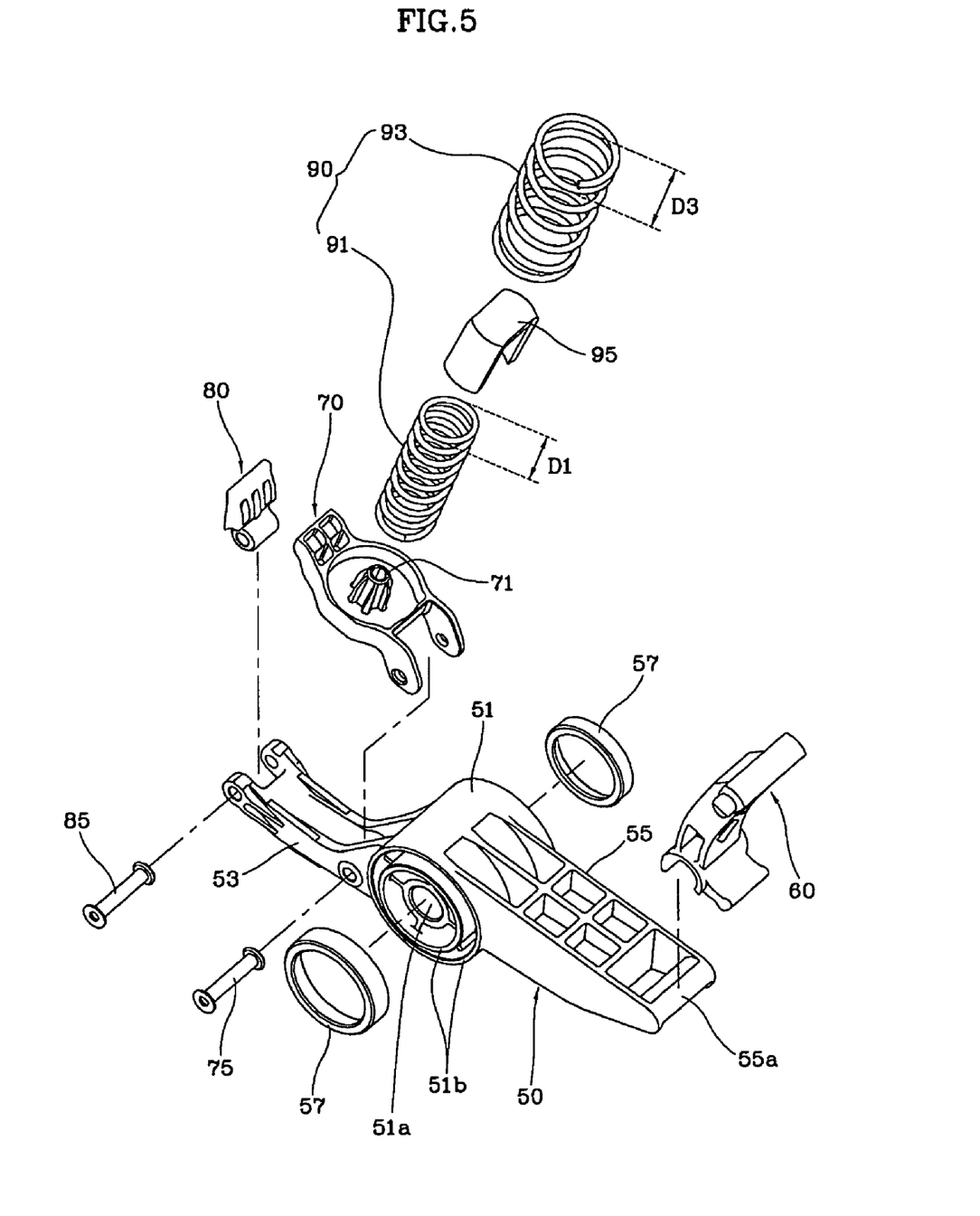
FIG. 5 is an exploded perspective view exclusively illustrating a rotation means and an elastic means of FIG. 1.
Figure 6:
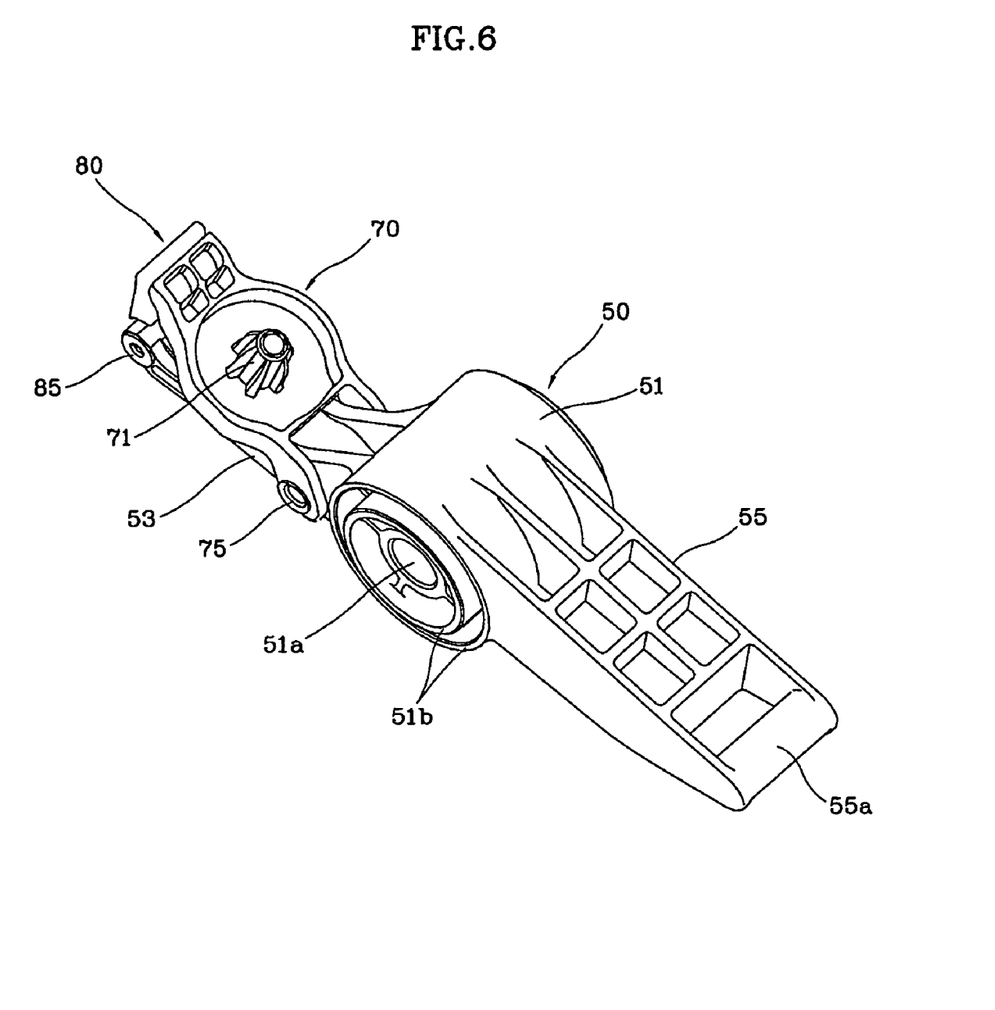
FIG. 6 is a perspective view of a coupled condition of the rotation means of FIG. 5.
Figure 7:
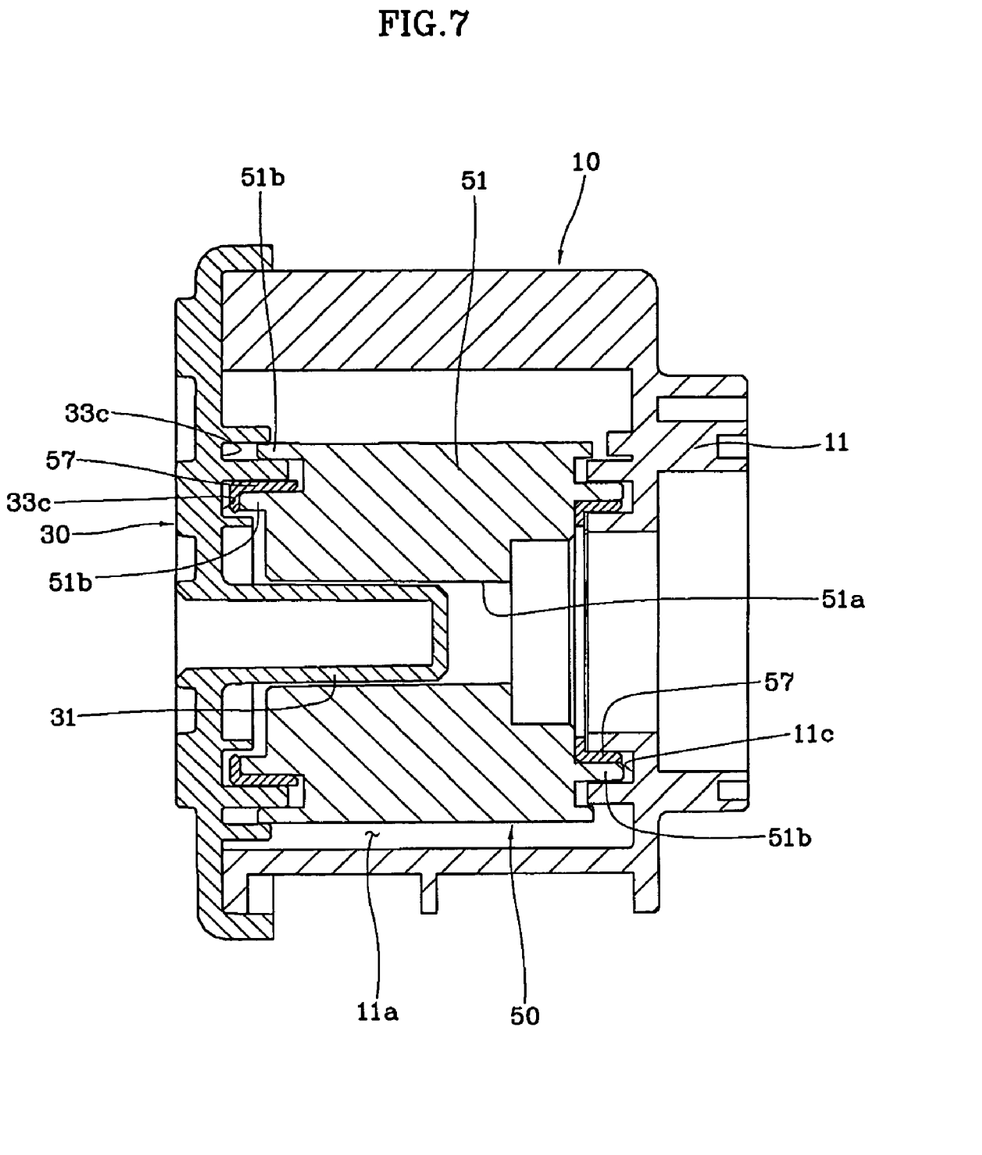
FIG. 7 is a cross-sectional view taken along the line 1-1 of FIG. 2.

FIG. 1 is an exploded perspective view of an electronic organ type accelerator pedal according to the present invention. FIGS. 2 and 3 are left and right side views of an assembly of the pedal of FIG. 1.

An electronic organ type accelerator pedal according to the present invention, as shown in FIGS. 1 to 7, is composed of a housing 10 that is fixedly disposed to a floor panel 1 under a driver's seat, a foot plate 20 wherein one end is coupled with the housing 10 by a hinge and other end is disposed to be rotated in a up and down direction of the housing 10 by driver's force on the pedal, a rotation means that is rotatable inside the housing 10 in conjunction with the operation of the foot plate 20, an elastic means that is supported by the rotation means and the inner side of the housing 10 at both ends to apply restoring force to the rotations means, a cover 30 that is coupled with the housing 10 to cover an opening at one side of the housing 10 and has a center protrusion 31 formed at one side of the cover 30 to be inserted in the rotation means and to serve as a rotating center, and a sensor 40 that is coupled with the other side of the housing 10 and outputs electrical signals to a throttle control unit to detect changes of output values based on the operation of the rotation means.

Here, the throttle control unit which has received electrical signals from the sensor 40 delivers control signals to drive an actuator, and the driving of the actuator causes a throttle valve to open/close so as to control the quantity of combustion.

The cover 30 and the sensor 40 are coupled by using a plurality of screws 35 and 45.

In the meantime, the housing 10 is composed of a body 11 and a plate coupling part 13.

The body 11 has an accommodation space 11a therein to accommodate the rotation means and the elastic means. An upper side of the body facing the foot plate 20 with respect to the accommodation space 11a has a connecting hole 11b.

In addition, the cover 30 is coupled with one side of the body 11 and the sensor 40 is coupled with the other side to cover up the accommodation space 11a.

The plate coupling part 13 is formed to extend from the body 11, and coupled with one end of the foot plate 20 by a hinge.

In the plate coupling part 13, a coupling groove 13a that is opened in one direction is formed along the width direction L. A hinge film 21 which is inserted in the coupling groove 13a to serve as a hinge is integrated to one end of the foot plate 20.

The rotation means is composed of a rotation arm 50, a carrier 60, and a spring plate 70. The rotation arm 50 includes a cylinder 51 having a protrusion hole 51a penetrating the center part at both sides, front and rear arms 53 and 55 protruding from the outer surface of the cylinder 51 in opposite directions to each other.

In addition, the rotation arm 50 is disposed to seesaw such that the center protrusion 31 of the cover 30 is inserted in the protrusion hole 51a.

The carrier 60 is disposed to penetrate the connecting hole 11b, and the upper end of the carrier is coupled with the foot plate 20 and the lower end of the carrier is coupled with the rear arm 55 of the rotation arm 50.

Here, the lower end of the carrier 60 is formed in a fork shape to be fitted with a rod 55a, which is provided at the end of the rear arm 55.

In addition, the carrier 60 serves to prevent the foot plate 20 from being rotated by its weight and thus overlapped on the housing 10.

The spring plate 70 is disposed to be coupled with a front arm 53 of the rotation arm 50 by a pivot 75, and to support the elastic means at the upper side.

According to the present invention, a friction shoe 80 is added to the rotation means.

The friction shoe 80 is coupled with the front arm 53 of the rotation arm 50 by a pivot 85 at one end so as to be adjacent to the spring plate 70, and the leading end of the friction shoe is disposed so as to be in contact with the spring plate 70.

The friction shoe 80 is brought in selective contact with the inner side of the body 11 of the housing 10 during the operation of the rotation arm 50 thus causing friction; accordingly, hysteresis is obtained by reducing vibration and noise which are generated when output of an engine is increased.

Meanwhile, a flange 51b is formed in a circumferential direction to protrude in a lateral direction at both sides of the cylinder 51 of the rotation arm 50, the flange 51b is inserted in flange grooves 11c and 33c formed in the body 11 of the housing 10 and the cover 30, respectively, to be coupled.

Here, a bushing 57 is inserted between the flange 51b and the flange grooves 11c and 33c, and the bushing 57 prevents abrasion due to friction.

A compression spring 90 is used as the elastic means, the lower end of the compression spring 90 is fitted with a spring protrusion 71 protruding from the spring plate 70, and the upper end of the spring extending upward is inserted in a spring groove lid formed at upper inner side of the body 11.

According to the invention, the compression spring 90 has a double structure composed of an interior spring 91 and an exterior spring 93.

The exterior spring 93 has a larger diameter D3 than the diameter D1 of the interior spring 91, such that the exterior spring is fitted at the outside of the interior spring 91.

A pad member 95 is interposed between the interior spring 91 and the exterior spring 93 to prevent interference, and a sponge is used as the pad member 95.

Hereinafter, operation and effect according to the embodiment of the invention will be described.

When a driver steps on the foot plate 20, the foot plate 20 rotates toward the housing 10 by the hinge film 21, and thus the carrier 60 descends.

The descent of the carrier 60 causes the rotation arm 50 to rotate clockwise with respect to the center protrusion 31, in the condition shown in FIG. 3, and at this moment, the compression spring 90 is deformed such that the entire length is shortened.

In the meantime, the sensor 40 detects changes of output values based on the operation of the rotation arm 50 and sends electrical signals to the throttle control unit, and the throttle control unit sends control signals to drive the actuator to open/close the throttle valve, thereby controlling the quantity of combustion.

When the foot of the driver is removed from the foot plate 20, the rotation arm 50 is rotated counterclockwise by restoring force of the compression spring 90, and the carrier 60 ascends, and the foot plate 20 is rotated away from the housing 10 so as to return to an initial position.

In addition, when the foot plate 20 is reversely rotated, the maximum rotation angle is restricted by the carrier 60; therefore, the foot plate 20 returns to the initial position at all times to prepare for the next operation.

Therefore, the electronic organ type accelerator pedal according to the present invention is capable of maximizing stability by the compression spring 90 having a double structure and the carrier 60 restricting the reverse rotation of the foot plate 20, while maintaining the benefit of the electronic accelerator pedal which is capable of ensuring space, improving an operation feeling and reducing driver's fatigue since the electronic accelerator pedal is not influenced by tension changes of the cable, and improving fuel efficiency by improving fuel consumption rate.

That is, the foot plate 20 which is rotated toward the housing 10 by driver's force on the pedal rotates reversely away from the housing 10 when the foot of the driver is removed from the pedal so as to return to the initial position. At this time, if a driver's shoe or cloth is caught on the foot plate 20, the foot plate 20 deviates from a normal condition shown in FIG. 4, and is pulled back completely.

The above-described case may occur when the driver travels on a steep incline.

However, according to the invention, since the carrier 60 restricts the maximum rotation angle of the reverse rotation of the foot plate 20, the foot plate 20 is prevented from deviating from the normal condition and being pulled back completely as described above, thereby improving stability of a vehicle.

On the contrary, when the driver travels on a steep downhill road, the foot plate 20 is forced to rotate toward the housing 10 by its weight, but the carrier 60 which receives force from the compression spring 90 through the rotation arm 50 restricts the rotation of the foot plate 20, thus improving stability of operation.

In addition, according to the invention, even when either the interior spring 91 or the exterior spring 93 is damaged, the remainder can sufficiently function, which also significantly improves stability.

As described above, the electronic organ type accelerator pedal according to the present invention is capable of enhancing stability by the compression spring having a double structure and the carrier restricting the reverse rotation of the foot plate, while maintaining the benefit of the electronic accelerator pedal which is capable of ensuring space, improving an operation feeling and reducing driver's fatigue since the electronic accelerator pedal is not influenced by tension changes of the cable, and improving fuel efficiency by improving fuel consumption rate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electronic organ accelerator pedal, comprising:

a housing;

a foot plate wherein one end is coupled with the housing by a hinge and another end is disposed to be moved in an up and down direction of the housing by driver's force on the foot plate;

rotation means disposed to be rotated inside the housing in conjunction with operation of the foot plate;

elastic means supported by the rotation means and an inner side of the housing to apply restoring force to the rotation means;

a cover coupled with the housing to cover an opening at one side of the housing, said cover having a center protrusion formed at one side of the cover to be inserted in the rotation means and to serve as a rotating center; and a sensor coupled with the other side of the housing to provide outputs based on operation of the rotation means;

wherein said rotation means includes:

a rotation arm having a cylinder with a protrusion hole and front and rear arms protruding from an outer surface of the cylinder, the center protrusion of the cover being inserted in the protrusion hole;

a carrier disposed to penetrate a connecting hole in said housing wherein an upper end of the carrier is coupled with the foot plate and a lower end of the carrier is coupled with the rear arm of the rotation arm;

a spring plate disposed to be coupled with the front arm of the rotation arm to support the elastic means; and a friction shoe wherein one end is coupled with the front arm of the rotation arm so as to be adjacent to the spring plate, and the other end is disposed so as to be in contact with the spring plate, such that when the friction shoe is brought in selective contact with an inner side of the housing during operation of the rotation arm, friction, vibration and noise are reduced when output of an engine is increased.

2. The electronic organ accelerator pedal as set forth in claim 1, wherein the housing includes:

a body having an accommodation space therein to accommodate the rotation means and the elastic means, in which an upper side of the body facing the foot plate with respect to the accommodation space has the connecting hole and the cover is coupled with one side of the body and the sensor is coupled with the other side to cover up the accommodation space; and a plate coupling part formed to extend from the body, and coupled with one end of the foot plate by the hinge.

3. The electronic organ accelerator pedal as set forth in claim 2, wherein a coupling groove that is opened in one direction is formed along a width direction in the plate coupling part, and a hinge film which is inserted in the coupling groove to serve as the hinge is integrated to one end of the foot plate.

4. The electronic organ accelerator pedal as set forth in claim 1, wherein a flange is formed along a circumferential direction to protrude in a lateral direction at both sides of the cylinder, and the flange is inserted in flange grooves formed in the body of the housing and the cover, respectively, to be coupled.

5. The electronic organ accelerator pedal as set forth in claim 4, wherein a bushing is inserted between the flange and the flange grooves.

6. The electric organ accelerator pedal as set forth in claim 1, wherein the elastic means is a compression spring, wherein a lower end is fitted around a spring protrusion protruding from the spring plate, and an upper end extending upward is inserted in a spring groove formed at upper inner side of the body.

7. The electronic organ accelerator pedal as set forth in claim 6, wherein the compression spring includes an interior spring, and an exterior spring having a larger diameter than the diameter of the interior spring, such that the exterior spring is fitted outside of the interior spring.

8. The electronic organ accelerator pedal as set forth in claim 7, wherein a pad member is interposed between the interior spring and the exterior spring to prevent interference.

9. The electronic organ accelerator pedal as set forth in claim 8, wherein a sponge is used as the pad member.

* * * * *